United States Patent
Patil et al.

(10) Patent No.: US 10,419,543 B2
(45) Date of Patent: Sep. 17, 2019

(54) METHOD AND SYSTEM FOR ESTABLISHING A CONNECTION BETWEEN A SEEKER DEVICE AND A TARGET DEVICE

(71) Applicant: Samsung Electronics Co., Ltd., Gyeonggi-do (KR)

(72) Inventors: Mayuresh Madhukar Patil, Bangalore (IN); Se-Hee Han, Seoul (KR)

(73) Assignee: Samsung Electronics Co., Ltd (KR)

(*) Notice: Subject to any disclaimer, the term of this patent is extended or adjusted under 35 U.S.C. 154(b) by 362 days.

(21) Appl. No.: 14/640,647

(22) Filed: Mar. 6, 2015

(65) Prior Publication Data

US 2015/0256627 A1 Sep. 10, 2015

(30) Foreign Application Priority Data

Mar. 6, 2014 (IN) .......................... 1149/CHE/2014
Feb. 27, 2015 (IN) .......................... 1149/CHE/2014

(51) Int. Cl.
*H04L 29/08* (2006.01)

(52) U.S. Cl.
CPC ........ *H04L 67/141* (2013.01); *H04L 67/1091* (2013.01); *H04L 67/16* (2013.01); *H04L 67/1061* (2013.01); *H04L 67/2809* (2013.01)

(58) Field of Classification Search
CPC . H04L 67/141; H04L 67/1091; H04L 67/104; H04L 63/166; H04L 67/1065; H04L 67/14; H04L 45/7453; H04L 29/12009; H04L 29/12207; H04L 61/20; H04L 63/08; H04L 67/1046; H04L 67/1057; H04L 67/1095; H04L 67/34; H04L 69/329; H04L 63/0442;
(Continued)

(56) References Cited

U.S. PATENT DOCUMENTS 8,468,089 B1 * 6/2013 Abad-Peiro ............ G06Q 20/00
                                                                   705/35
8,565,676 B2   10/2013 Gormley et al.
(Continued)

FOREIGN PATENT DOCUMENTS

CN        101855889        10/2010
CN        102301761        12/2011
(Continued)

OTHER PUBLICATIONS

International Search Report dated May 27, 2015 issued in counterpart application No. PCT/KR2015/002182.
(Continued)

*Primary Examiner* — William G Trost, IV
*Assistant Examiner* — Tan Doan
(74) *Attorney, Agent, or Firm* — The Farrell Law Firm, P.C.

(57) ABSTRACT

A method for initiating a connection is provided. The method includes receiving an intent by an intermediate device from a seeker device when the seeker device is connected to the intermediate device, wherein the intent comprises a service intent and an identifier of the seeker device and initiating the connection by sending a connection request to a target device by the intermediate device, wherein the connection request comprises the identifier of the seeker device and at least one parameter.

11 Claims, 11 Drawing Sheets

(58) Field of Classification Search
CPC ............... H04L 63/105; H04L 63/164; G06F 17/30389; G06F 17/30477; G06F 9/544
USPC ........................................................ 709/228
See application file for complete search history.

(56) References Cited

U.S. PATENT DOCUMENTS

| | | | | |
|---|---|---|---|---|
| 10,230,790 | B2* | 3/2019 | Wang | H04L 67/104 |
| 2003/0055894 | A1* | 3/2003 | Yeager | G06F 9/544 |
| | | | | 709/204 |
| 2006/0233375 | A1* | 10/2006 | Lillie | H04L 63/068 |
| | | | | 380/270 |
| 2008/0002658 | A1 | 1/2008 | Soliman | |
| 2009/0125637 | A1* | 5/2009 | Matuszewski | H04L 63/166 |
| | | | | 709/238 |
| 2009/0158394 | A1* | 6/2009 | Oh | G06F 21/31 |
| | | | | 726/3 |
| 2010/0198952 | A1 | 8/2010 | Kneckt et al. | |
| 2011/0161697 | A1 | 6/2011 | Qi et al. | |
| 2012/0044815 | A1 | 2/2012 | Geirhofer et al. | |
| 2013/0034023 | A1 | 2/2013 | Jung | |
| 2013/0148642 | A1* | 6/2013 | Abraham | H04W 8/005 |
| | | | | 370/338 |
| 2013/0227152 | A1* | 8/2013 | Lee | H04W 48/16 |
| | | | | 709/227 |
| 2014/0019513 | A1 | 1/2014 | Han et al. | |
| 2014/0031078 | A1 | 1/2014 | Nishikawa | |
| 2014/0040984 | A1* | 2/2014 | Mackler | G06F 11/28 |
| | | | | 726/3 |
| 2014/0310419 | A1* | 10/2014 | Bolan | H04L 67/141 |
| | | | | 709/227 |
| 2015/0163300 | A1* | 6/2015 | Kumar | H04L 67/1046 |
| | | | | 709/205 |

FOREIGN PATENT DOCUMENTS

CN 103582155 2/2014
WO WO 2014/019857 2/2014

OTHER PUBLICATIONS

European Search Report dated Sep. 27, 2017 issued in counterpart application No. 15759245.2-1853, 10 pages.
Chinese Office Action dated Oct. 8, 2018 issued in counterpart application No. 201580012351.7, 31 pages.

* cited by examiner

METHOD AND SYSTEM FOR ESTABLISHING A CONNECTION BETWEEN A SEEKER DEVICE AND A TARGET DEVICE

PRIORITY

This application claims priority under 35 U.S.C. § 119(a) to Indian Provisional Patent Application Serial No. 1149/CHE/2014, which was filed in the Indian Intellectual Property Office on Mar. 6, 2014 and Indian Complete Patent Application Serial No. 1149/CHE/2014, which was filed in the Indian Intellectual Property Office on Feb. 27, 2015, the entire disclosures of which are incorporated herein by reference.

BACKGROUND OF THE INVENTION

1. Field of the Invention

The present invention relates generally to wireless systems, and more particularly, to a method and system for initiating a connection between a seeker device and a target device.

2. Description of the Related Art

The IEEE 802.11 family of technical standards and attendant technology, also commonly referred to as Wi-Fi, is evolving towards a service-centric model of connectivity where devices connect for a specific purpose. The purposeful connections are triggered by applications looking for peer devices that support specific services. Examples of these services include file sharing, printing, media streaming, sensor information, and the like.

In general, there is typically a service advertiser role (i.e., target device) and a service seeker role (i.e., seeker device) in setting up the connection. The service seeker is an application which seeks for an advertised service by connecting to the service advertiser. The service advertiser is an application that is visible to provide potential service seekers and expects incoming connection requests from the interested service seekers. The service seeker initiates an Application Session Protocol (ASP) session establishment and the service advertiser responds to an incoming request to establish the ASP session.

In existing systems, the seeker device can be connected to the target device to invoke the services supported by the target device. The seeker device follows a standard set of procedures for initiating a connection with the target device which can be time consuming and unnecessary at times. A Media Access Control (MAC) address can be exchanged between the seeker device and the target device to automatically trigger the connectivity between the seeker device and the target device. The triggering connectivity can be a Wi-Fi or a Wi-Fi Direct. After triggering the connectivity, the seeker device establishes a service session with the target device.

Existing systems fails to allow the seeker device to be connected to the target device automatically without following the standard set of connection procedures.

SUMMARY OF THE INVENTION

The present invention has been made to address at least the above mentioned problems and/or disadvantages and to provide at least the advantages described below.

An aspect of the present invention is to provide a method for initiating a connection between a seeker device and a target device.

An aspect of the present invention is to provide a method to send a connection request by the intermediate device to the target device.

Another aspect of the present invention is to provide a system for establishing a connection between the seeker device and the target device after receiving an identifier and one or more Peer-to-Peer (P2P) parameters of the target device by the seeker device from an intermediate device.

In accordance with an aspect of the present invention, a method for initiating a connection between a seeker device and a target device is provided. The method includes receiving intent by an intermediate device from the seeker device when the seeker device is connected to the intermediate device. The intent includes service intent and an identifier of the seeker device. Further, the method includes initiating the connection by sending a connection request to the target device by the intermediate device. The connection request includes the identifier of the seeker device and at least one parameter.

In accordance with an aspect of the present invention, a system for establishing a connection is provided. The system includes a seeker device that is configured to send intent to an intermediate device when the seeker device is connected to the intermediate device. The intent includes service intent and an identifier of the seeker device. Further, the seeker device is configured to receive an identifier and at least one Peer-to-Peer (P2P) parameter of the target device from the intermediate device. Further, the system includes the intermediate device that is configured to send a connection request to the target device. The connection request includes the identifier of the seeker device and at least one parameter. Further, the seeker device is configured to establish the connection with the target device based on the identifier and the at least one P2P parameter of the target device.

In accordance with an aspect of the present invention, a seeker device for establishing a connection is provided. The seeker device is configured to send intent to an intermediate device when the seeker device is connected to the intermediate device. The intent includes service intent and an identifier of the seeker device. Further, the seeker device is configured to receive an identifier and at least one P2P parameter of the target device from the intermediate device. Further, the seeker device is configured to establish the connection with the target device based on the identifier and the at least one P2P parameter of the target device.

In accordance with an aspect of the present invention, an intermediate device to send a connection request is provided. The intermediate device is configured to receive intent from a seeker device when the seeker device is connected to the intermediate device. The intent includes service intent and an identifier of the seeker device. Further, the intermediate device is configured to send an identifier and at least one P2P parameter of a target device to the seeker device. Further, the intermediate device is configured to send the connection request to the target device. The connection request includes an identifier of a seeker device and at least one parameter.

In accordance with an aspect of the present invention, a computer program product including a computer executable program code recorded on a computer readable non-transitory storage medium. The computer executable program code when executed performs a method for initiating a connection. The method includes receiving an intent by an intermediate device from a seeker device when the seeker device is connected to the intermediate device; the intent includes service intent and an identifier of the seeker device, and sending a connection request by the intermediate device to a target device; the connection request includes the identifier of the seeker device and at least one parameter.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF THE EMBODIMENTS OF THE INVENTION

Figure 1:
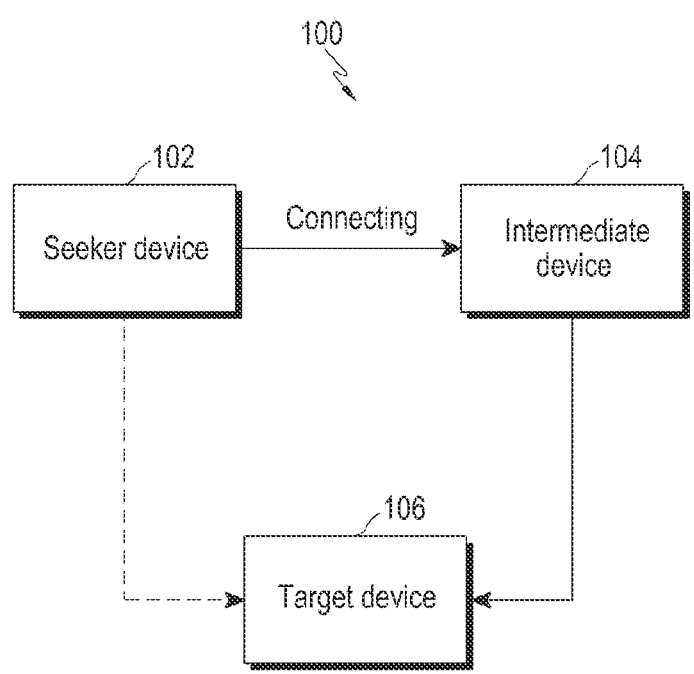
FIG. 1 is a block diagram illustrating a system for establishing a connection between a seeker device and a target device, according to an embodiment of the present invention.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments.

The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The embodiments herein provide a method and system for establishing a connection between a seeker device and a target device. The method includes tapping or connecting a seeker device to an intermediate device. Further, the method includes receiving intent by the intermediate device from the seeker device.

The intent can include service intent and an identifier of the seeker device. The identifier can be a Media Access Control (MAC) address. Further, the method includes initiating a connection by sending a connection request by to the target device by the intermediate device. The connection request includes the identifier of the seeker device and one or more parameters. The parameters can be, but are not limited to duration of validity of the session and the intent of the seeker device.

Further, the method includes receiving an identifier and at least one P2P parameter of the target device by the seeker device from the intermediate device. The identifier can be a MAC address. The P2P parameter can be, for example but not limited to a listening channel, an operating channel, a Service Set Identification (SSID) or a Basic Service Set Identification (BSSID). Further, the method includes establishing the connection between the seeker device and the target device based on the identifier and the P2P parameters of the target device.

The method includes sending a device discovery request by the seeker device to the target device based on the identifier of the target device and the listening channel. Further, the method includes sending a provision discovery request to the target device by the seeker device after receiving a device discovery response from the target device. Further, the method includes authenticating the seeker device by the target device based on the connection request received from the intermediate device earlier. Further, the method includes establishing the connection between the seeker device and the target device after successful authentication of the seeker device.

The method includes sending an association request by the seeker device to the target device based on the identifier, the operating channel, and the SSID or the BSSID. Further, the method includes authenticating the seeker device by the target device based on the connection request received from the intermediate device earlier. Further, the method includes establishing the connection between the seeker device and the target device after successful authentication of the seeker device.

The method includes sending a provision discovery request by the target device to the seeker device. Further, the method includes authenticating the target device by the seeker device based on the connection request received from the intermediate device. Further, the method includes establishing the connection between the seeker device and the target device.

The intermediate device is a trusted device, where a trust is created based on an active connection between the intermediate device and the target device or a request allowing the intermediate device to create a trusted relation with one or more trusted devices to the target device.

The request can be sent in P2P action frames or an internet protocol (IP). The request can be referred to as a device provisioning request or a device provisioning protocol. In conventional systems, exchanging of the MAC address enables two devices to trigger the connectivity automatically to establish a session. The connection mechanism follows the standard set of procedures for initiating the connection, which, as noted above, can be a time consuming process and unnecessary at times.

Unlike conventional systems, the connection request including the identifier of the seeker device and the parameters, as described herein, can be sent by the intermediate device to the target device which helps in establishing the connection between the seeker device and the target device based on the identifier and the P2P parameters of the target device.

Unlike conventional systems, the method and system described herein can extend a connection mechanism thereby allowing the use of the intermediate device for connecting the seeker device to the target device. Further, the method and system provides access to the target device without requiring the seeker device to connect to the target device, thus improving the connection experience for the user; this is required when it is difficult to connect to the target device for example, the printer is located in another room. Further, the method and system optimizes the service invocation and the direct connection procedures between the seeker device and the target device.

FIG. 1 is a block diagram illustrating a system 100 for establishing a connection between a seeker device 102 and a target device 106, according to an embodiment of the present invention. The system 100 includes the seeker device 102, an intermediate device 104, and the target device 106.

The seeker device 102 and the intermediate device 104 can be, for example, but not limited to a, laptop, desktop computer, mobile phone, smart phone, Personal Digital Assistant (PDA), tablet, phablet, consumer electronic device, or any other electronic device. The target device 106 can be, for example, but not limited to a, mobile phone, smart phone, Television, Stereo player, printer, or the like, a variety of electronic devices, such as mobile communication terminals, smart phones, Portable Multimedia Player (PMP), digital broadcasting players, a PDA, music players, display devices, mobile game consoles, and digital cameras, all of which operate based on one of the communication protocols corresponding to a variety of communication systems.

The seeker device 102 can include appropriate interfaces to directly or indirectly communicate with the intermediate device 104, the target device 106 and other various devices over the network.

The network described herein can be for example, but not limited to a Wi-Fi network and a Wi-Fi Direct network.

A trust can be created based on the active connection between the intermediate device 104 and the target device 106.

The trust can be created based on a request allowing the intermediate device 104 to create the trusted relation with the trusted devices to the target device 106. Thus, the intermediate device 104 can be considered as the trusted device to the target device 106, as shown in the FIG. 1.

The request can be sent in the P2P action frames or an IP. The request is referred to as the device provisioning request or the device provisioning protocol.

The seeker device 102 discovers the intermediate device 104, and the seeker device 102 is connected to the intermediate device 104 to establish the connection with the target device 106. Further, the seeker device 102 sends the intent to the intermediate device 104. The intent can include the service intent and the identifier of the seeker device 102. The identifier can be the MAC address. In an example, the service can be, but not limited to a send service, a play service, a display service, a print service, a chat service, a beam service, or the like. After receiving the intent, the intermediate device 104 sends the identifier and the P2P parameters of the target device 106 to the seeker device 102.

The P2P parameters can be, for example but not limited to the listening channel, the operating channel, and the SSID or the BSSID.

Further, the intermediate device 104 sends the connection request to the target device 106. The connection request can be the device provisioning request or the device provisioning protocol. The connection request includes the identifier of the seeker device 102 and the parameters.

The parameters can be, for example but not limited to the duration of validity of the session and the intent of the seeker device 102.

The seeker device 102 sends the device discovery request to the target device 106 based on the identifier of the target device 106 and the listening channel. After successful device discovery, the seeker device 102 sends the provision discovery request to the target device 106 after receiving a device discovery response from the target device 106. Further, the target device 106 authenticates the seeker device 102 based on the connection request received from the intermediate device 104, after receiving the provision discovery request. Further, the seeker device 102 establishes the connection with the target device 106 after successful authentication of the seeker device 102.

The seeker device 102 sends the association request to the target device 106 based on the identifier, the operating channel, and the SSID or the BSSID. The association request can be the device provisioning request or the device provisioning protocol. After receiving the association request, the target device 106 authenticates the seeker device 102 based on the connection request including the identifier of the seeker device 102 received from the intermediate device 104. Further, the seeker device 102 can be configured to establish the connection with the target device 106 after successful authentication of the seeker device 102.

The seeker device 102 can be configured to receive the device discovery request from the target device 106. After receiving the device discovery request, the seeker device 102 can be configured to send a device discovery response to the target device 106. After receiving the device discovery response, the target device 106 sends the provision discovery request to the seeker device 102. After receiving the provision discovery request, the seeker device 102 authenticates the target device 106. The seeker device 102 sends the provision discovery response to the target device 106 after successful authentication. Further, the seeker device 102 can be configured to establish the connection with the target device 106.

FIG. 1 shows a limited overview of the system 100 according to an embodiment of the present invention, but it is to be understood that other embodiments are not limited thereto. Further, the system 100 can include any number of electronic devices along with other hardware or software components communicating with each other. For example, the component can be, but not limited to, a process running in the controller or processor, an object, an executable process, a thread of execution, a program, or a computer. By way of illustration, both an application running on a device and the device itself can be a component.

Figure 2:
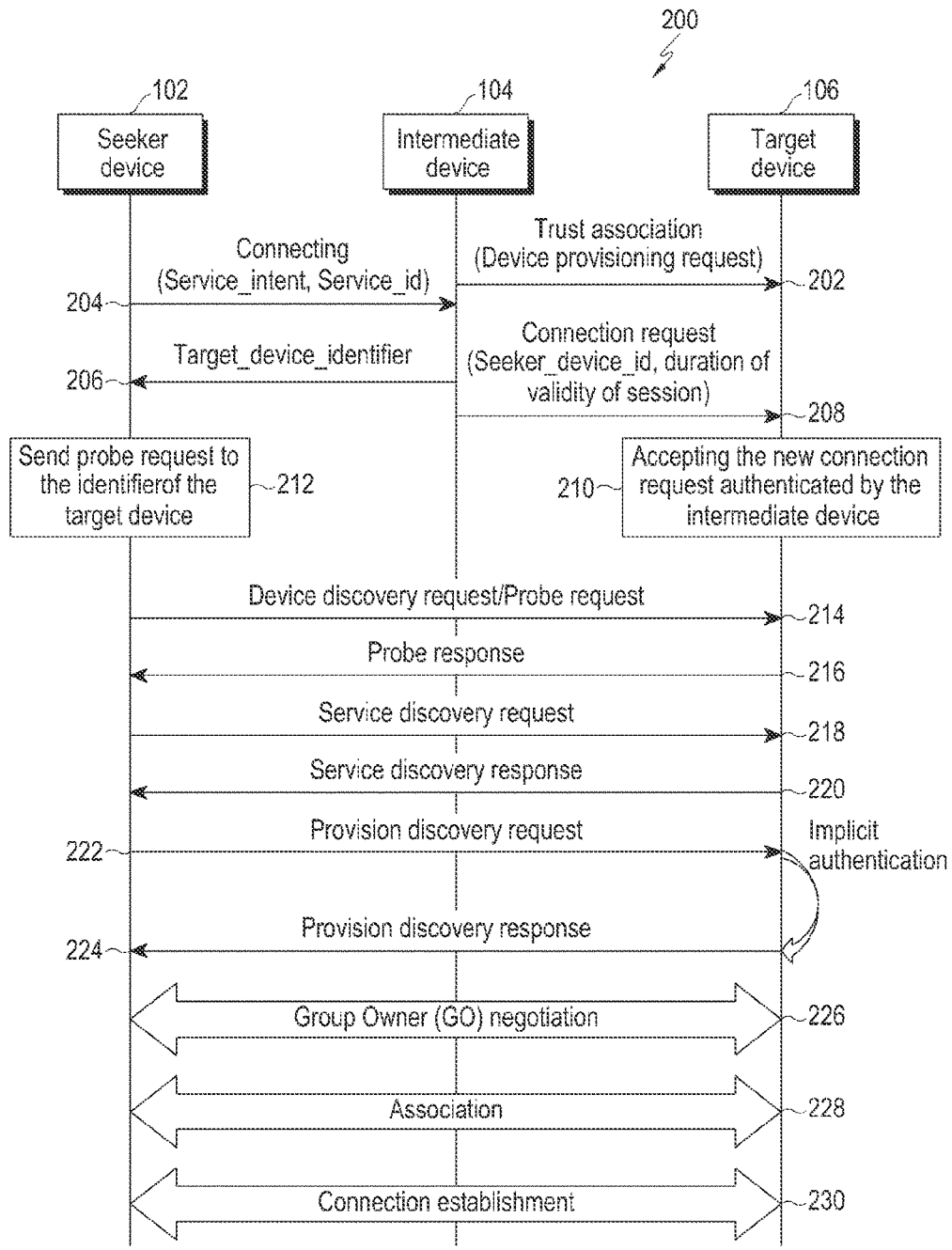
FIG. 2 is a signaling diagram illustrating a connection between the seeker device and the target device, according to an embodiment of the present invention.

FIG. 2 is a signaling diagram illustrating a connection between the seeker device 102 and the target device 106, according to an embodiment of the present invention. The signaling sequence depicts communication between the seeker device 102, the intermediate device 104, and the target device 106.

Initially, at step 202, trust association is created between the intermediate device 104 and the target device 106, which builds the trust between the intermediate device 104 and the target device 106. After the trust association, the intermediate device 104 can be referred to as a trusted device to the target device 106 where the service is hosted. The trust between the intermediate device 104 and the target device 106 can be created when there is the active connection between the intermediate device 104 and the target device 106. The request can be sent to the target device 106, which allows the intermediate device 104 to set a trust relation with one or more trusted devices to the target device 106. The request can be sent in the P2P the P2P action frames or the IP. The request is referred to as the device provisioning request or the device provisioning protocol.

At step 204, the seeker device 102 sends the intent to the intermediate device 104 (i.e., the trusted device) when the seeker device 102 is connected to the intermediate device 104. The intent can include the service intent, service connection request, a service identification (i.e., service_id), and the identifier of the seeker device 102 where the identifier can be the MAC address. In an example, the service can be the send service, the play service, the display service, the print service, the chat service, the beam service, or the like. After receiving the intent, at step 206, the intermediate device 104 sends the response message including the identifier and the P2P parameters of the target device 106 to the seeker device 102, where the identifier can be the MAC address. The P2P parameters can be, for example but not limited to the listening channel, the operating channel, the SSID or the BSSID, or the like.

At step 208, the intermediate device 104 sends the connection request to the target device 106, where the connection request includes the identifier of the seeker device 102 and the parameters. The parameters can be, for example but not limited to the duration of validity of the session, the intent of the seeker device 102, and the service in which the seeker device 102 is interested. The request can be sent in the P2P action frames or the IP. After receiving the connection request, at step 210, the target device 106 accepts the connection request authenticated by the intermediate device 104. Further, the target device 106 makes the necessary state machine changes either a P2P interface or a Wi-Fi interface. The request can be referred to as the device provisioning request or the device provisioning protocol.

After receiving the identifier and the P2P parameters of the target device 106, at step 212, the seeker device 102 initiates the device discovery request. Further, at step 214, the seeker device 102 sends the probe request to the target device 106 based on the identifier of the target device 106 received from the intermediate device 104. After receiving the probe request, at step 216, the target device 106 sends a probe response to the seeker device 102.

At step 218, the seeker device 102 sends the service discovery request to the target device 106 based on the identifier of the target device 106 and the listening channel. After receiving the service discovery request, at step 220, the target device 106 sends the service discovery response to the seeker device 102. At step 222, the seeker device 102 sends the provision discovery request for initiating the connection with the target device 106. Further, after receiving the provision discovery request, the target device 106 authenticates the seeker device 102 based on the connection request received from the intermediate device 104 earlier.

After authenticating the seeker device 102, at step 224, the target device 106 sends the provision discovery response to the seeker device 102. At step 226, a group owner (GO) negotiation will be initiated between the seeker device 102 and the target device 104. The seeker device 102 forms the GO. Alternatively, the target device 106 can form the GO. At step 228, association between the seeker device 102 and the target device 106 takes place. At step 230, the seeker device 102 establishes the session with the target device 106 based on the identifier and the P2P parameters of the target device 106. Unlike conventional systems, the seeker device 102 can be connected to the target device 106 for establishing the session without any explicit user interaction.

Figure 3:
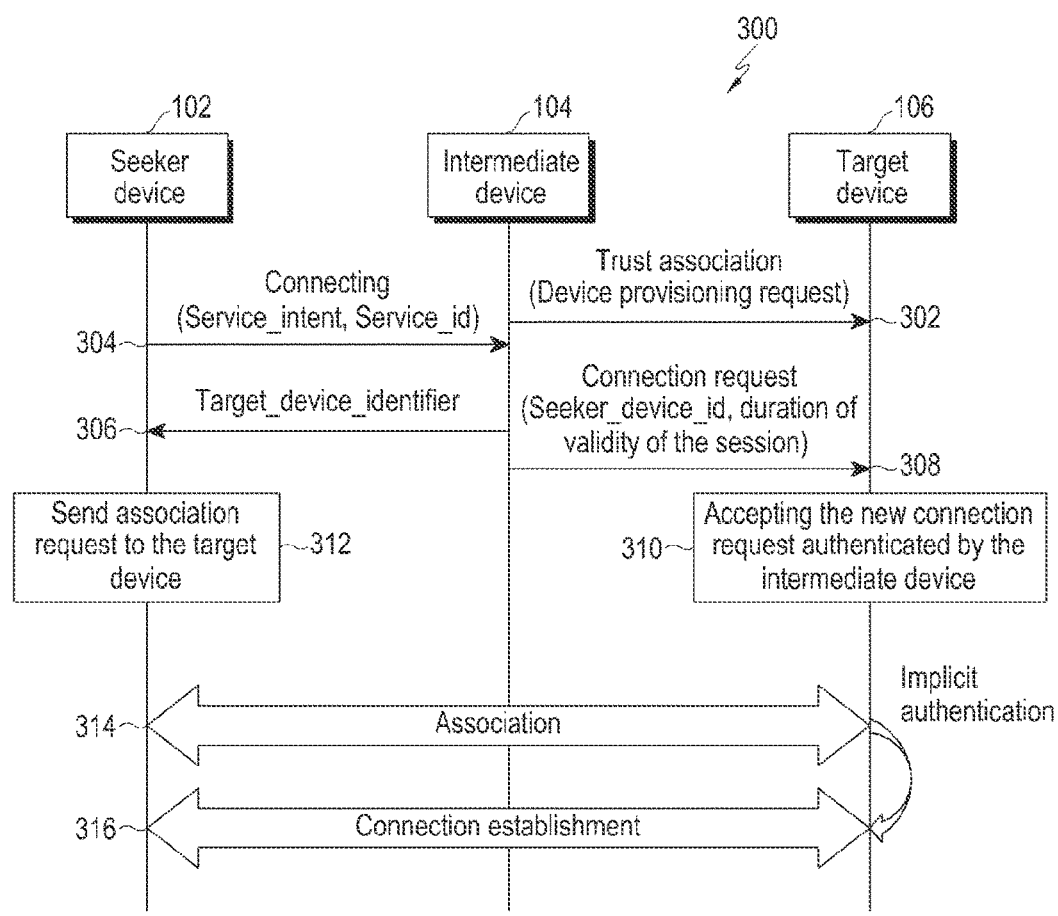
FIG. 3 is a signaling diagram illustrating a connection between the seeker device and the target device, according to an embodiment of the present invention.

FIG. 3 is a signaling diagram illustrating a connection between the seeker device 102 and the target device 106, according to an embodiment of the present invention.

Steps 302, 304, 306, 308, and 310 are the same as steps 202, 204, 206, 208, and 210 of the FIG. 2 and are not described herein.

At step 312, the seeker device 102 sends the association request to the target device 106 based on the identifier, the operating channel, and the SSID or the BSSID of the target device 106. The target device 106 becomes the GO for the P2P connection or an Access Point (AP) for the infrared connection. At step 314, the seeker device 102 directly sends the association request to the target device 106. After receiving the association request, the target device 106 authenticates the seeker device 102 based on the connection request received from the intermediate device 104. At step 316, the seeker device 102 establishes the session with the target device 104 after successful authentication of the seeker device 102 by the target device 106.

Unlike convention systems, intent and the P2P parameters are exchanged between the seeker device 102 and the intermediate device 104, thus allowing the seeker device 102 to optimize the P2P connection or an infrared connection with the target device 106.

Figure 4:
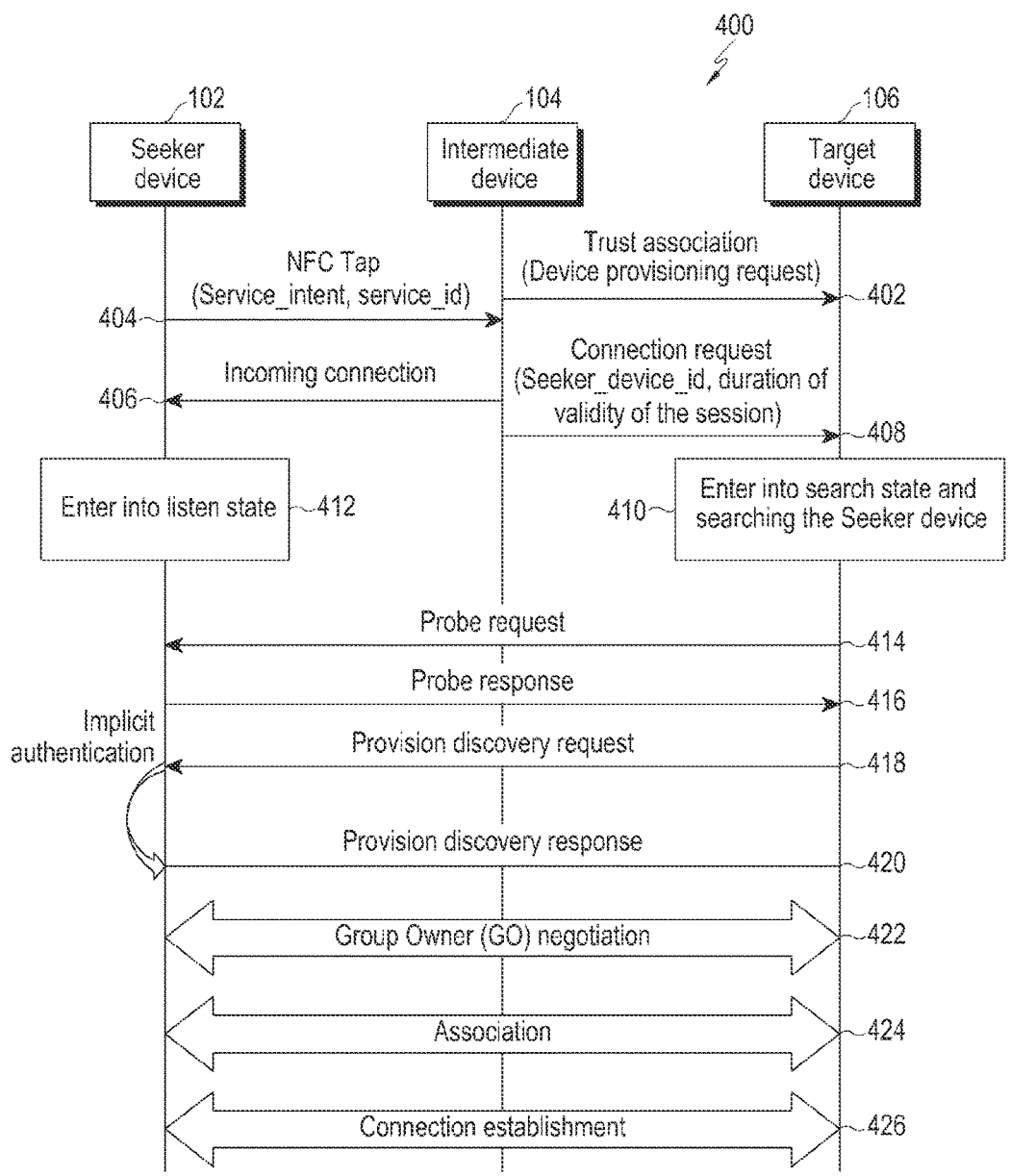
FIG. 4 is a signaling diagram illustrating a connection between the seeker device and the target device, according to an embodiment of the present invention.

FIG. 4 is a signaling diagram illustrating a connection between the seeker device 102 and the target device 106, according to an embodiment of the present invention. In FIG. 4, the target device 106 is assumed to be operating in a hidden mode.

Steps 402, 404, 406, and 408 are the same as steps 202, 204, 206, and 208 of the FIG. 2 and are not described herein.

Further, the target device 106 enters into a connection mode initiating the discovery of the seeker device 102.

At step 410, the target device 106 enters into a search state and searches for the seeker device 102.

At step 412, the seeker device 102 enters into a listening state to receive any incoming connections to establish a connection with the target device 106. At step 414, the target device 106 sends the probe request to the seeker device 102. After receiving the probe request, at step 416, the seeker device 102 sends the probe response to the target device 106.

At step 418, the target device 106 sends the provision discovery request to the seeker device 102. After receiving the provision discovery request, the seeker device 102 authenticates the target device 106 based on the identifier of the target device 106. After authenticating the target device 106, at step 420, the seeker device 102 sends the provision discovery response to the target device 106.

Steps 422 and 424 are the same as steps 220 and 222, of the FIG. 2 and are not described herein.

At step 426, the seeker device 102 establishes the connection with the target device 106 after authenticating successfully the target device 106.

Figure 5:
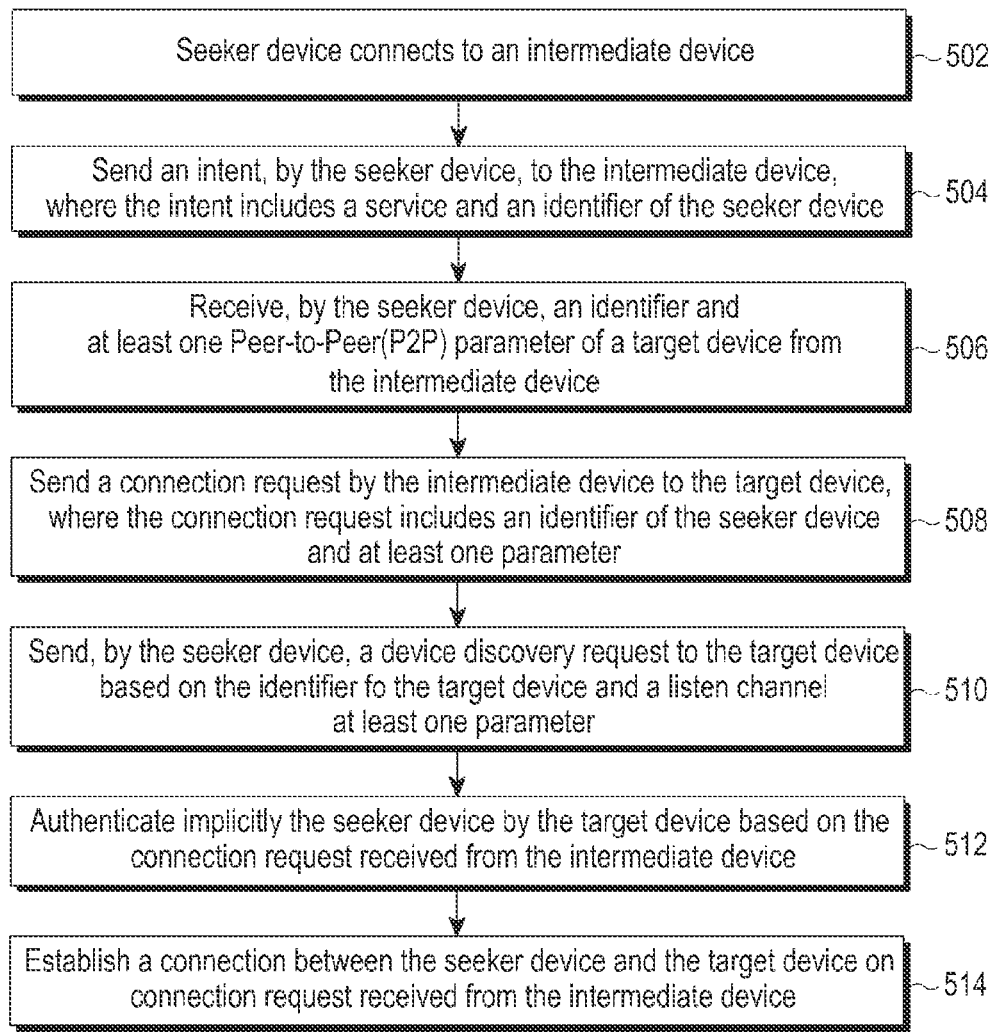
FIG. 5 is a flowchart illustrating a method for establishing a connection between the seeker device and the target device, according to an embodiment of the present invention.

FIG. 5 is a flowchart illustrating a method for establishing a connection between the seeker device 102 and the target device 106, according to an embodiment of the present invention. At step 502, the method 500 includes connecting the seeker device 102 to the intermediate device 104. At step 504, the method 500 includes sending the intent by the seeker device 102 to the intermediate device 104. The intent includes the service intent and the identifier of the seeker device 102. In an example, the service can be, for example, but not limited to the send service, the play service, the display service, the print service, the chat service, the beam service, or the like. At step 506, the method 500 includes receiving the identifier and the P2P parameters of the target device 106 by the seeker device 102 from the intermediate device 104. The identifier can be the MAC address.

At step 508, the method includes sending the connection request by the intermediate device 104 to the target device 106. The connection request includes the identifier of the seeker device 102 and the parameters. The connection request can be sent in the P2P action frames or the IP. The request is referred to as the device provisioning request or the device provisioning protocol. At step 510, the method includes sending the device discovery request to the target device 106 by the seeker device 102 based on the identifier of the target device 106 and the listen channel. After receiving the device discovery request, the target device 106 sends the device discovery response to the seeker device 102. Further, the seeker device 102 sends the provision discovery request to the target device 106.

At step 512, the method includes authenticating the seeker device 102 after receiving the provision discovery request by the target device 106 based on the connection request including the identifier of the seeker device 102 received from the intermediate device 104. After successful authentication, the target device 106 sends the provision discovery response to the seeker device 102. At step 514, the method includes establishing the connection by the seeker device 102 with the target device 106 after receiving the provision discovery response.

The various actions, acts, blocks, steps, and the like in the method of FIG. 5 may be performed in the order presented, in a different order or simultaneously. Further, some actions, acts, blocks, steps, and the like may be omitted, added, modified, skipped, and the like without departing from the scope of the invention.

Figure 6:
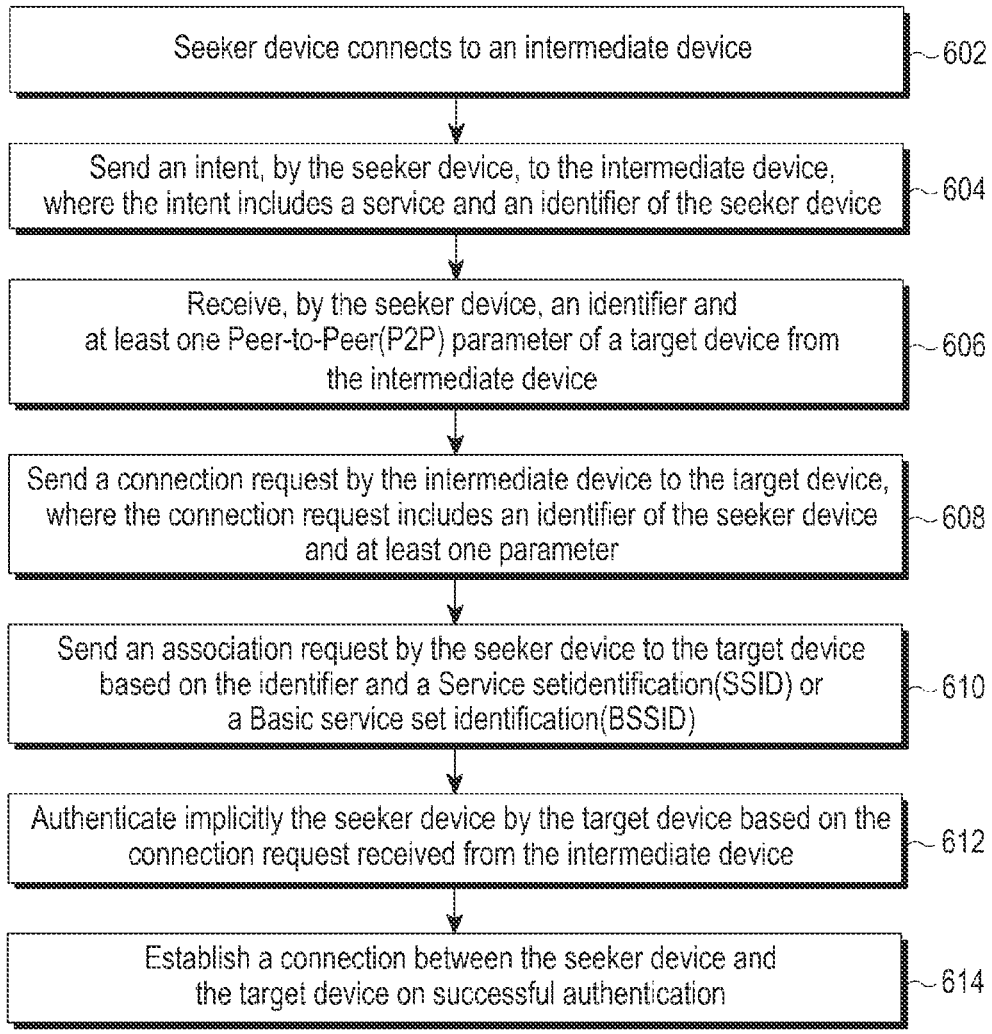
FIG. 6 is flowchart illustrating a method for establishing a connection between the seeker device and the target device, according to an embodiment of the present invention.

FIG. 6 is flowchart illustrating a method for establishing a connection between the seeker device 102 and the target device 106, according to an embodiment of the present invention. At step 602, the method includes connecting the seeker device 102 to the intermediate device 104. At step 604, the method includes sending the intent by the seeker device 102 to the intermediate device 104. The intent includes the service intent and the identifier of the seeker device 102. In an example, the service can be, for example, but not limited to the send service, the play service, the display service, the print service, the chat service, the beam service, or the like. At step 606, the method includes receiving the identifier and the P2P parameters of the target device 106 by the seeker device 102 from the intermediate device 104. The identifier can be, for example, the MAC address.

At step 608, the method includes sending the connection request by the intermediate device 104 to the target device 106. The connection request includes the identifier of the seeker device 102 and the parameters. The connection request can be sent in the P2P action frames or the IP. The connection request is referred as the device provisioning request or the device provisioning protocol. At step 610, the method includes sending the association request by the seeker device 102 to the target device 106 based on the identifier, the operating channel, and the SSID or the BSSID.

At step 612, the method includes authenticating the seeker device 102 by the target device 106 based on the connection request including the identifier of the seeker device 102 received from the intermediate device 104. At step 614, the method includes establishing the connection by the seeker device 102 with the target device 106 after successful authentication.

The various actions, acts, blocks, steps, and the like in the method of FIG. 6 may be performed in the order presented, in a different order or simultaneously. Further, some actions, acts, blocks, steps, and the like may be omitted, added, modified, skipped, and the like without departing from the scope of the invention.

Figure 7:
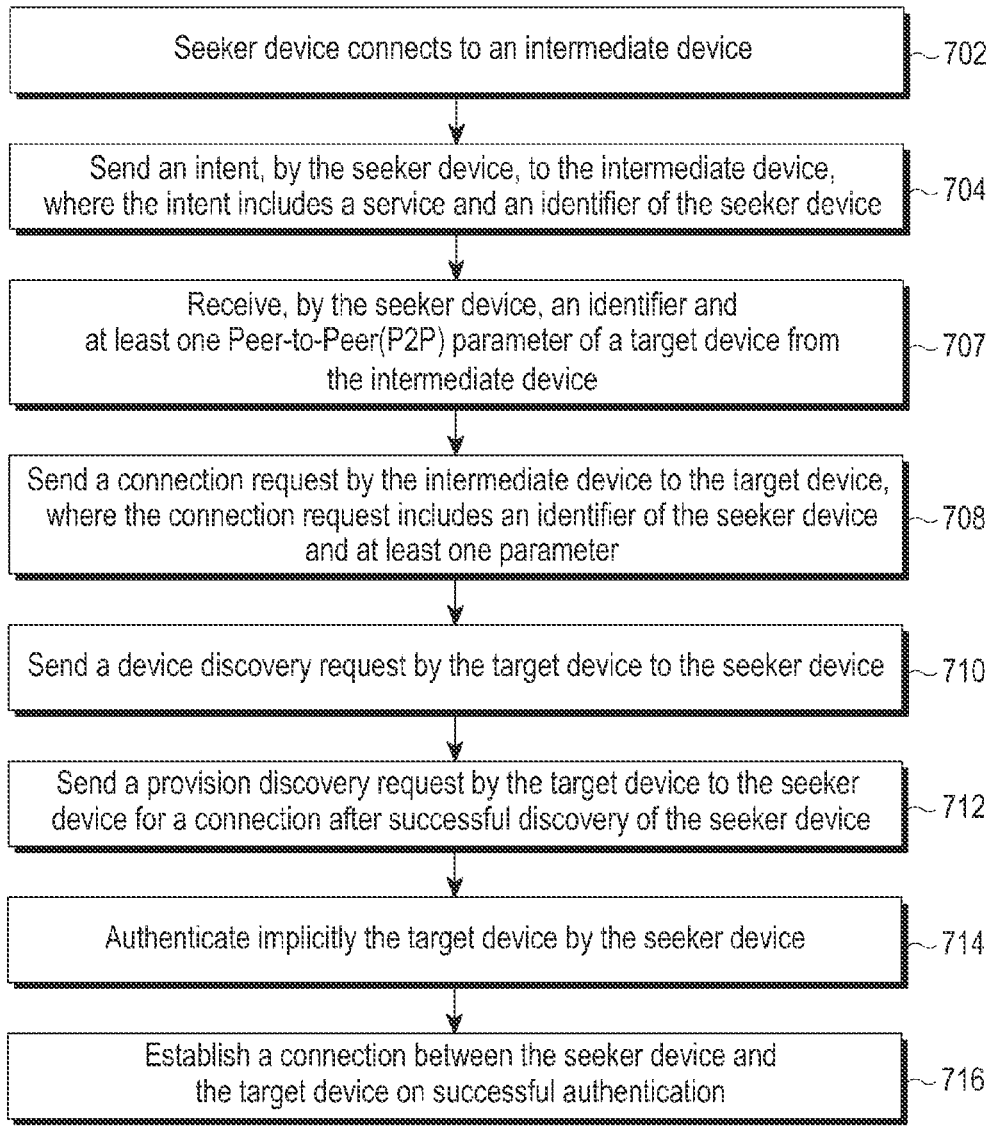
FIG. 7 is flowchart illustrating a method for establishing a connection between the seeker device and the target device, according to an embodiment of the present invention.

FIG. 7 is flowchart illustrating a method for establishing a connection between the seeker device 102 and the target device 106, according to an embodiment of the present invention, according to embodiments as disclosed herein. At step 702, the method includes connecting the seeker device 102 to the intermediate device 104. At step 704, the method includes sending the intent by the seeker device 102 to the intermediate device 104. The intent includes the service intent and the identifier of the seeker device 102. In an example, the service can be, for example, but not limited to the send service, the play service, the display service, the print service, the chat service, the beam service, or the like. At step 706, the method includes receiving the identifier and the P2P parameters of the target device 106 by the seeker device 102 from the intermediate device 104. The identifier can be, for example, the MAC address.

At step 708, the method includes sending the connection request by the intermediate device 104 to the target device 106. The connection request includes the identifier of the seeker device 102 and the parameters. The connection request can be sent in the P2P action frames or the IP. The request is referred to as the device provisioning request or the device provisioning protocol. At step 710, the method includes sending the device discovery request by the target device 106 to the seeker device 102. At step 712, the method includes sending the provision discovery request by the target device 106 to the seeker device 102 for the connection after successfully discovering the seeker device 102.

At step 714, the method includes authenticating the target device 106 by the seeker device 102 based on the connection request including the identifier of the target device 106. At step 716, the method includes establishing the connection by the seeker device 102 with the target device 106 after successful authentication of the target device 106.

The various actions, acts, blocks, steps, and the like in the method of FIG. 7 may be performed in the order presented, in a different order or simultaneously. Further, some actions, acts, blocks, steps, and the like may be omitted, added, modified, skipped, and the like without departing from the scope of the invention.

Figure 8:
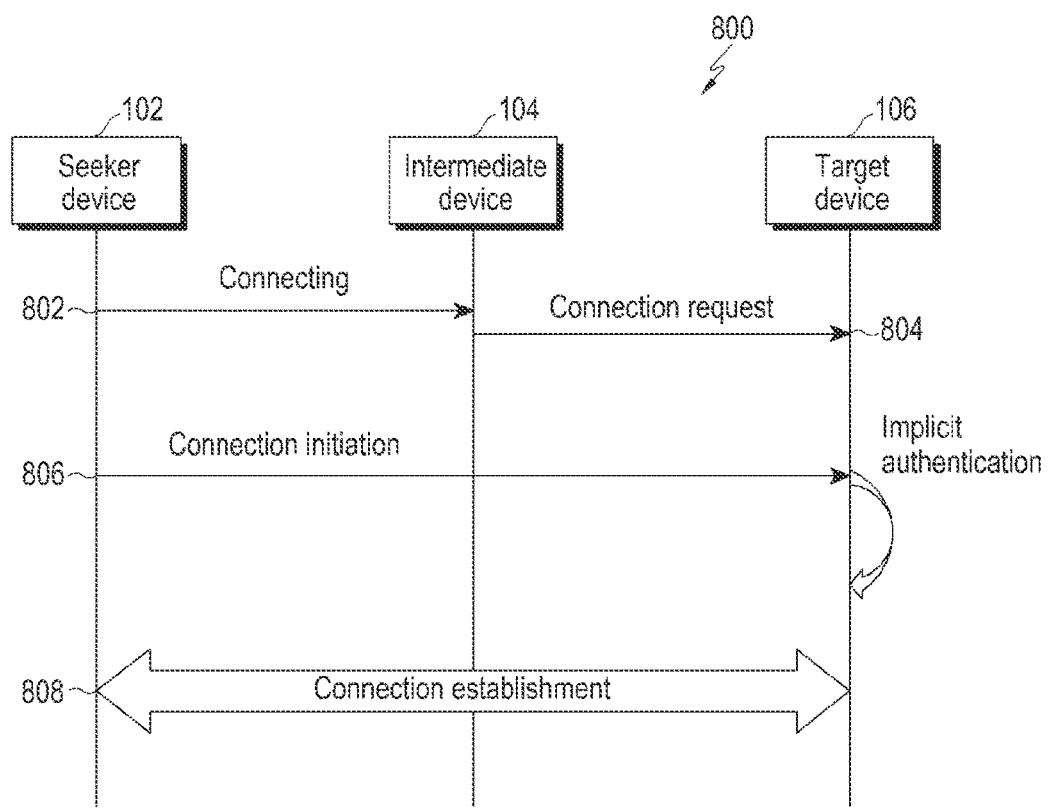
FIG. 8 is a diagram illustrating a system for establishing a connection between the seeker device and the target device, according to an embodiment of the present invention.

FIG. 8 is a diagram illustrating a system 800 for establishing a connection between the seeker device 102 and the target device 106, according to an embodiment of the present invention. In a scenario where a user "Alice" is associated with the intermediate device 104 and the target device 106 and the user "Bob" is associated with the seeker device 102, the target device 106 can be a Wi-Fi printer. Initially, the user "Alice" sets up the target device 106 (i.e., printer) with the predefined PIN or the password. Further, the user "Alice" can access the target device 106 by using the intermediate device 104 from anywhere in his/her home to print a document which is of users interest.

Further, in a situation where the user "Bob" associated with the seeker device 102 visits the user "Alice" home on the weekend, the user "Bob" may be interested to share his recently visited trip photos with the user "Alice" and at the same time the user "Bob" may wish to take print out of the photos by accessing the target device 106 through his/her seeker device 102. The user "Bob" can initiate a print session with the target device 106 by connecting the seeker device 102 to the intermediate device 104. Further, the seeker device 102 sends the intent to the intermediate device 104. After establishing the connection from the seeker device 102, the intermediate device 104 sends the intent of the target device 106 to the seeker device 102. Further, the intermediate device 104 sends the connection request including the intent of the seeker device and the duration of validity of the session to the target device 106.

Further, the seeker device 102 sends the request to initiate the print connection with the target device 106. After receiving the request, the target device 106 authenticates the seeker device 102 based on the intent of the seeker device 102. After successful authentication of the seeker device 102, the print connection is established between the seeker device 102 and the target device 106; thus, without any explicit user interaction the print connection can be established between the seeker device 102 and the target device 106.

Figure 9:
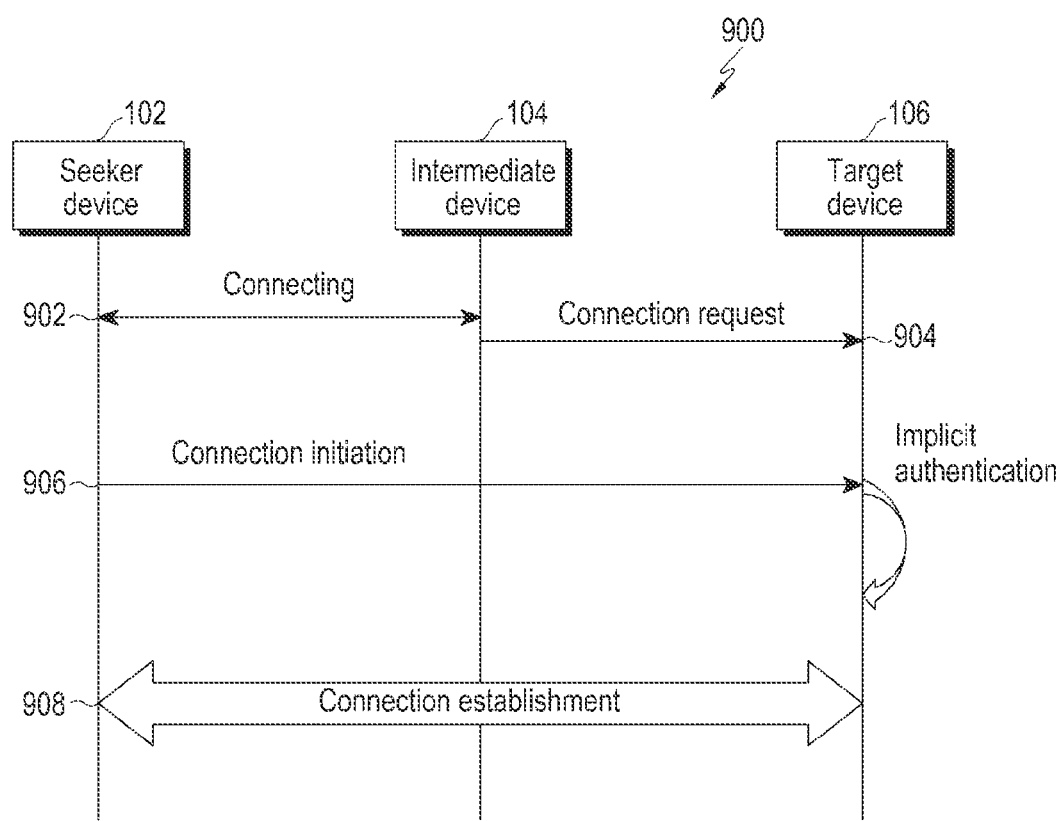
FIG. 9 is a diagram illustrating a system for establishing a connection between the seeker device and the target device, according to an embodiment of the present invention.

FIG. 9 is a diagram illustrating a system 900 for establishing a connection between the seeker device 100 and the target device 106, according to an embodiment of the present invention. In a scenario where the user "Alice" is associated with the intermediate device 104 and the target device 106 and the user "Bob" is associated with the seeker device 102, the target device 106 can be a Wi-Fi direct storage device with a set of stored movies. Initially, the user "Alice" sets up the target device 106 (i.e., Wi-Fi direct storage device) with the predefined PIN or the password. Further, the user "Alice" can access the content in the target device 106 by using the intermediate device 104 (i.e., Television (TV)) from anywhere in his/her home.

Further, in a situation where the user "Bob" associated with the seeker device 102 visits the user "Alice" home on the weekend, the user "Alice" and the user "Bob" may decide to watch a new movie which the user "Alice" has downloaded. The user "Alice" turns on the TV and browses the content using a Wi-Fi direct Wi-Fi serial bus (WSB) feature. The user "Bob" wishes to copy the movie in the seeker device 102 to share with his/her family. The user "Bob" connects the seeker device 102 to the intermediate device 104. The seeker device 102 sends the intent to the intermediate device 104. After establishing the connection, the intermediate device 104 sends the intent of the target device 106 to the seeker device 102. Further, the intermediate device 104 sends the connection request including the intent of the seeker device 102 and the duration of validity of the session to the target device 106.

Further, the user "Bob" sends the request from the seeker device 102 to the target device 106 to receive the movie from the target device 106. After receiving the request, the target device 106 authenticates the seeker device 102 based on the intent of the seeker device 102. After successful authentication, the connection is established between the seeker device 102 and the target device 106 where the movie is transferred from the target device 106 to the seeker device 102 without any explicit user interaction.

Figure 10:
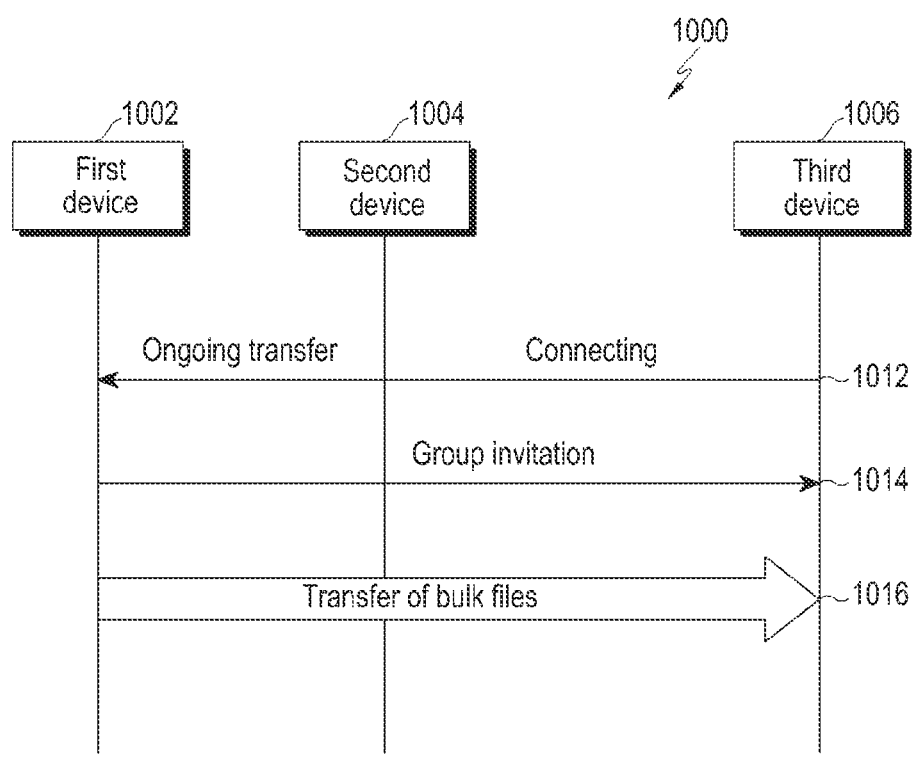
FIG. 10 is a diagram illustrating a system for simultaneously transferring files to multiple users, according to an embodiment of the present invention.

FIG. 10 is a diagram illustrating a system 1000 for simultaneously transferring files to multiple users, according to an embodiment of the present invention. The system 1000 includes a first device 1002, a second device 1004, and a third device 1006, where the user "Alice" is associated with the first device 102, the user "Bob" is associated with the second device 104, and the user "Steve" is associated with the third device 106.

The user "Alice" and the user "Bob" are in a restaurant and relaxing, they are waiting for the user "Steve". The user "Alice" shares his/her photos or videos with the user "Bob" by connecting the first device 1002 of the user "Alice" with the second device 1004 of the user "Bob". The user "Steve" joins both the user "Alice" and the user "Bob" in the restaurant. The user "Steve" connects his third device 1006 to the first device 1002 of the user "Alice". After establishing the connection, the first device 1002 sends the group invitation to the third device 1006 and transfers the same photos or the videos to the third device 1006 of the user "Steve" without any additional click. The first device 1002 of the user "Alice" automatically detects the ongoing transfer and transfer the same session to Steve as well.

Figure 11:
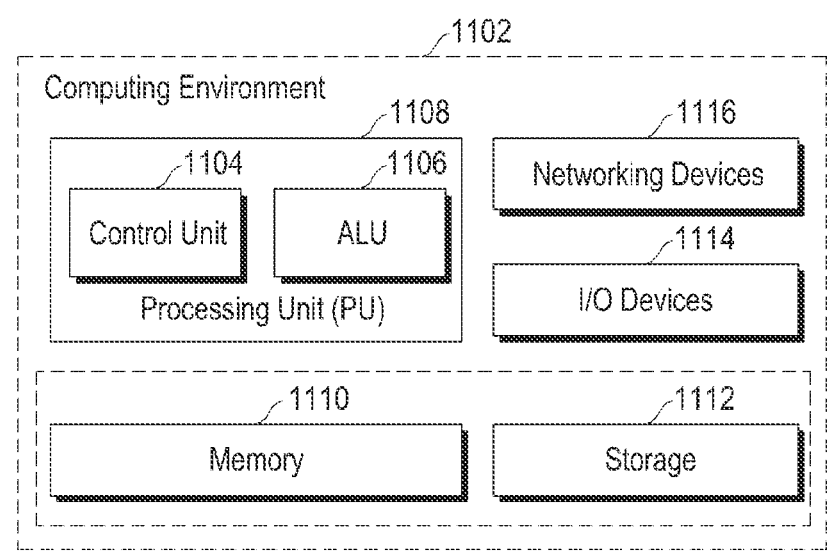
FIG. 11 is a block diagram illustrating a computing environment implementing the method and system for establishing a connection between the seeker device and the target device, according to an embodiment of the present invention.

FIG. 11 is a block diagram illustrating a computing environment 1102 implementing the method and system for establishing a connection between the seeker device and the target device, according to an embodiment of the present invention. The computing environment 1102 comprises at least one processing unit 1108 that is equipped with a control unit 1104 and an Arithmetic Logic Unit (ALU) 1106, a memory 1110, a storage unit 1112, plurality of networking devices 1116 and a plurality Input output (I/O) devices 1114. The processing unit 1108 is responsible for processing the instructions of the algorithm. The processing unit 1108 receives commands from the control unit in order to perform its processing. Further, any logical and arithmetic operations involved in the execution of the instructions are computed with the help of the ALU 1106.

The overall computing environment 1102 can be composed of multiple homogeneous and/or heterogeneous cores, multiple CPUs of different kinds, special media and other accelerators. The processing unit 1108 is responsible for processing the instructions of the algorithm. Further, the plurality of processing units 1108 may be located on a single chip or over multiple chips.

The algorithm comprising of instructions and codes required for the implementation are stored in either the memory unit 1110 or the storage 1112 or both. At the time of execution, the instructions may be fetched from the corresponding memory 1110 and/or storage 1112, and executed by the processing unit 1108.

In case of any hardware implementations, various networking devices 1116 or external I/O devices 1114 may be connected to the computing environment to support the implementation through the networking unit and the I/O device unit.

The methods and systems disclosed herein can be implemented through at least one software program running on at least one hardware device and performing network management functions to control the elements. The elements shown in FIGS. 1-11 include blocks which can be at least one of a hardware device, or a combination of hardware device and software module.

While the present invention has been shown and described with reference to certain embodiments thereof, it should be understood by those skilled in the art that many variations and modifications of the method and apparatus described herein will still fall within the spirit and scope of the present invention as defined in the appended claims and their equivalents.

What is claimed is:

1. A method for supporting an initial connection between a seeker device and a target device through an intermediate device, the method comprising:
    creating, by the intermediate device, a trusted relation with the target device by transmitting a request for the trusted relation in a first peer to peer (P2P) action frame to the target device, wherein the intermediate device is considered a trusted device to the target device after creating the trusted relation;
    receiving, by the intermediate device, an intent from the seeker device when the intermediate device is connected to the seeker device, wherein the intent includes a service intent, a service connection request, a service identification, and an identifier of the seeker device indicating a media access control (MAC) address of the seeker device;
    transmitting, by the intermediate device, identifiers of the target device including a basic service set identification (BSSID), a listening channel, an operating channel, and a MAC address of the target device, to the seeker device, in response to receiving the intent from the seeker device; and
    transmitting, by the intermediate device, a connection request in a second P2P action frame to the target device for connecting between the seeker device and the target device,
    wherein the connection request comprises the identifier of the seeker device, the service intent, and an identifier of a service in which the seeker device is interested, and
    wherein the initial connection between the seeker device and the target device is established based on the identifier of the seeker device and the identifiers of the target device.

2. The method of claim 1, further comprising:
    receiving, by the target device, a device discovery request from the seeker device based on the identifiers of the target device;
    transmitting, by the target device, a device discovery response to the seeker device;
    receiving, by the target device, a provision discovery request from the seeker device;
    authenticating, by the target device, the seeker device based on the connection request in response to the provision discovery request.

3. The method of claim 2, wherein authenticating comprises:
    receiving, by the target device, an association request from the seeker device based on the identifiers of the target device; and
    authenticating, by the target device, the seeker device based on the connection request in response to receiving the association request.

4. A system for establishing an initial connection between a seeker device and a target device through an intermediate device, the system comprising:
    the seeker device configured to transmit an intent to the intermediate device when the seeker device is connected to the intermediate device, wherein the intent comprises a service intent a service connection request, a service identification, and an identifier of the seeker device indicating a media access control (MAC) address of the seeker device, and receive identifiers of the target device including a basic service set identification (BSSID), a listening channel, an operating channel, and a MAC address of the target device from the intermediate device; and
    an intermediate device configured to create a trusted relation by transmitting a request for the trusted relation in a first peer to peer (P2P) action frame to the target device with the target device, wherein the intermediate device is considered a trusted device to the target device after creating the trusted relation, receive the intent from the seeker device when the intermediate device is connected to the seeker device, transmit the identifiers of the target device to the seeker device in response to receiving the intent from the seeker device, transmit a connection request in a second P2P action frame, to the target device, for connecting between the seeker device and the target device, wherein the connection request comprises the identifier of the seeker device, the service intent, and an identifier of a service in which the seeker device is interested, and
    wherein the initial connection between the seeker device and the target device is established based on the identifier of the seeker device and the identifier of the target device.

5. The system of claim 4, wherein the target device is further configured to:
    receive a device discovery request from the seeker device based on the identifiers of the target device;
    transmit a device discovery response to the seeker device;
    receive a provision discovery request from the seeker device; and
    authenticate the seeker device based on the connection request in response to the provision discovery request.

6. The system of claim 4, wherein the target device is further configured to:
    receive an association request from the seeker device based on the identifier of the target device; and
    authenticate the seeker device based on the connection request in response to the association request.

7. A seeker device for establishing an initial connection between the seeker device and a target device through an intermediate device, wherein the seeker device is configured to:
    transmit an intent to the intermediate device when the seeker device is connected to the intermediate device, wherein the intent comprises a service intent, a service connection request, a service identification, and an identifier of the seeker device indicating a media access control (MAC) address of the seeker device, and an identifier of a service in which the seeker device is interested, and wherein a trusted relation is created between the intermediate device and the target device;
    receive identifiers of the target device including a basic service set identification (BSSID), a listening channel, an operating channel, and a MAC address of the target device from the intermediate device; and
    establish the initial connection with the target device based on the identifiers of the target device.

8. The seeker device of claim 7, wherein the seeker device is further configured to:
    transmit a device discovery request to the target device based on the identifiers of the target device;
    receive a device discovery response from the target device;
    transmit a provision discovery request to the target device; and receive a provision discovery response from the target device, wherein the initial connection is established in response to receiving the provision discovery response.

9. The seeker device of claim 7, wherein the seeker device is further configured to:
send an association request to the target device based on the identifiers of the target device, wherein the initial connection is established in response to sending the association request.

10. An intermediate device to support an initial connection between a seeker device and a target device, wherein the intermediate device is configured to:
create a trusted relation with the target device by transmitting a request for the trusted relation in a first peer to peer (P2P) action frame to the target device, wherein the intermediate device is considered as a trusted device to the target device after creating the trusted relation;
receive an intent from the seeker device when the intermediate device is connected to the seeker device, wherein the intent includes a service intent, a service connection request, a service identification, and an identifier of the seeker device indicating a media access control (MAC) address of the seeker device;
transmit identifiers of the target device including a basic service set identification (BSSID), a listening channel, an operating channel and a MAC address of the target device, to the seeker device, in response to receiving the intent from the seeker device;
transmit a connection request in a second P2P action frame to the target device for connecting between the seeker device and the target device,
wherein the connection request comprises the identifier of the seeker device, the service intent, and an identifier of a service in which the seeker device is interested, and
wherein the initial connection between the seeker device and the target device is established based on the identifier of the seeker device and the identifiers of the target device.

11. A computer program product comprising a computer executable program code recorded on a computer readable non-transitory storage medium, the computer executable program code when executed performs a method for supporting an initial connection between a seeker device and a target device through an intermediate device, the method comprising:
creating, by the intermediate device, a trusted relation with the target device, by transmitting a request for the trusted relation in a first peer to peer (P2P) action frame to the target device, wherein the intermediate device is considered as a trusted device to the target device after creating the trusted relation;
receiving, by the intermediate device, an intent from the seeker device when the intermediate device is connected to the seeker device, wherein the intent includes a service intent, a service connection request, a service identification, and an identifier of the seeker device indicating a media access control (MAC) address of the seeker device;
transmitting, by the intermediate device, identifiers of the target device including a basic service set identification (BSSID), a listening channel, an operating channel and a MAC address of the target device, to the seeker device, in response to receiving the intent from the seeker device; and
transmitting, by the intermediate device, a connection request in a second P2P action frame to the target device for connecting between the seeker device and the target device, wherein the connection request comprises the identifier of the seeker device, the service intent, and an identifier of a service in which the seeker device is interested, and
wherein the initial connection between the seeker device and the target device is established based on the identifier of the seeker device and the identifiers of the target device.

* * * * *